(No Model.)

H. F. EMMONS.
DINNER PAIL.

No. 245,145. Patented Aug. 2, 1881.

ATTEST:
J. F. VanRensselaer.
L. Fleming.

INVENTOR:
Herman F. Emmons.
per H. Lisle Fleming.
Attorney.

UNITED STATES PATENT OFFICE.

HERMAN F. EMMONS, OF TROY, NEW YORK.

DINNER-PAIL.

SPECIFICATION forming part of Letters Patent No. 245,145, dated August 2, 1881.

Application filed July 17, 1880. (No model.)

*To all whom it may concern:*

Be it known that I, HERMAN F. EMMONS, of the city of Troy, in the county of Rensselaer and State of New York, have invented a new and useful Improvement in Dinner-Pails, of which the following is a specification, reference being had therein to the accompanying drawings.

This invention relates to that class commonly known as the "compartment-pail;" and it consists in the construction and arrangement of exterior fittings and in the combination of interior vessels, my object being to perfect and simplify the same, as hereinafter more fully described.

Figure 1:
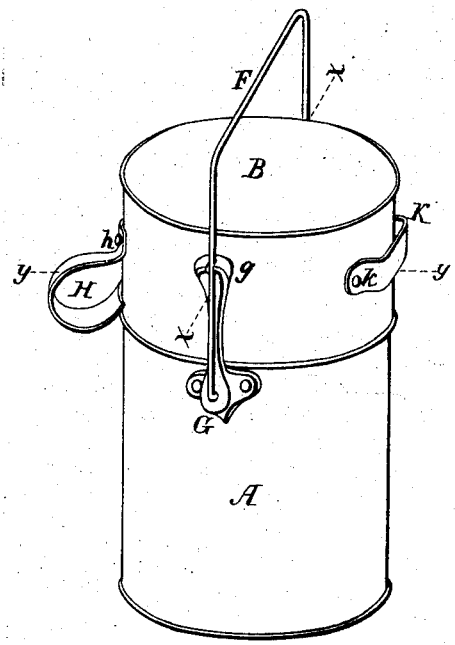
Figure 4:
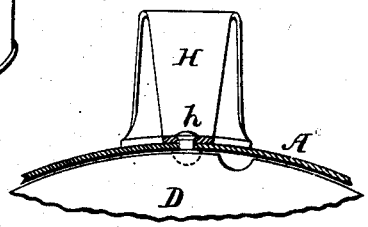
Figure 3:
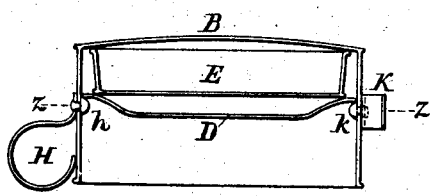
Figure 2:
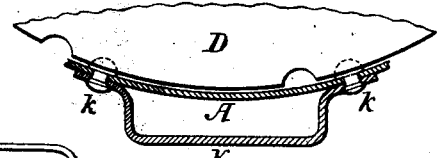
Figure 2:
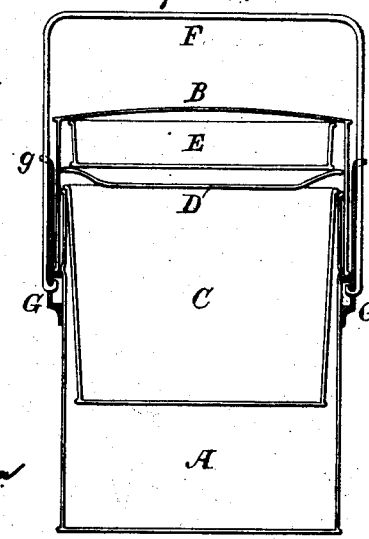

In the drawings, Figure 1 is a perspective view, showing exterior of my improved device. Fig. 2 is a full vertical section, showing the same internally. Fig. 3 is a partial vertical section, and Fig. 4 shows enlarged or detail views, partly in section, which three latter views are taken respectively where shown by dotted lines $x\,x$ and $y\,y$ in Fig. 1 and $z\,z$ in Fig. 3.

Similar letters of reference in each indicate corresponding parts.

A represents the outer and main portion or body of pail, and B an outwardly-surrounding cover, extending slightly above and below the upper edge of same.

C, D, and E represent various sized and shaped inner vessels, which, when arranged as shown, in conjunction with the main portion A and cover B aforesaid, form three distinct compartments to receive different articles of food.

F represents the usual spring-wire bail hung in recessed or socketed ears G G, from which project vertically-flanged extensions or prongs $g\,g$, notched to receive bail when in an upright position, to prevent objectionable swinging, as shown in Figs. 1 and 2, said ears being riveted or otherwise attached to opposite sides of body, as likewise shown, the cover aforesaid being provided with handle H, to facilitate the use of same as a drinking-vessel, and also with loop or socket K, wherein knife and fork may be carried, which are, respectively, attached by rivets $h$ and $k\,k$ with heads projecting inwardly, so as to form stops or catches to support the vessel or dish D within said cover, the rim or edge of said dish being notched to admit of passage over the same and securing by partial rotation the vessel E being supported above thereby, all as shown in Figs. 3 and 4, the lowermost inner vessel, C, being supported within body by flanged rim resting upon upper edge of same, as shown in Fig. 2, the space unoccupied thereby forming one of the compartments before mentioned.

The improved pail is designed to operate as follows: By removing the cover B, and consequently therewith the dish D and vessel E, access may be had to the lower vessel, C; and by also removing the latter to the space or compartment beneath, access may likewise be had to vessel E by disengaging the rim of dish D from rivet-heads $h$ and $k\,k$, or both may thus be removed from cover when desirable to use the same as a drinking-vessel.

The following advantages are derived from the construction herein described: The double use of ears as bail attachments and retaining-clutches; the double use, also, of rivets for attaching outer fixtures and securing vessels within cover; the auxiliary vessel that may thus be carried for use as a dish or dining-plate, and the increase of capacity within main portion of pail by extending cover above the same, so as to afford space for an additional vessel or compartment therein.

I do not claim, broadly, a dinner-pail constructed with outwardly-surrounding cover nor inwardly-fitting dishes or vessels, as I am aware that similar devices have been used before in pails of this class; but What I do claim, and desire to secure by Letters Patent, is—

1. In dinner-pails, the combination of dish D, having notched rim, and the vessel E, so constructed that the former may support the latter within cover B when inserted from beneath, and engaged by inwardly-projecting heads of rivets $h$ and $k\,k$ with said cover and with each other, substantially as shown and described, for the objects herein set forth.

2. In combination with the body A and spring-bail F, the recessed or socketed ears G G, provided with notched extending prongs $g\,g$, as and for the purpose specified.

3. In combination with cover B, notched dish D, handle H, and loop K, the rivets $h$ and $k\,k$, with inwardly-projecting heads, as and for the purpose specified.

In witness whereof I have hereunto set my hand this 23d day of June, 1880.

HERMAN F. EMMONS.

Attest:
H. LISLE FLEMING,
ROBERT S. MAYER.